May 26, 1925. Re. 16,085

S. F. SUTHERLAND

COLLAPSIBLE FOLDING BOX

Original Filed May 17, 1921 4 Sheets-Sheet 1

Inventor

Stafford F. Sutherland.

By Eccleston & Eccleston

Attorneys

May 26, 1925. Re. 16,085

S. F. SUTHERLAND

COLLAPSIBLE FOLDING BOX

Original Filed May 17, 1921 4 Sheets-Sheet 2

Inventor

Stafford F. Sutherland

By Eccleston & Eccleston

Attorneys

May 26, 1925. Re. 16,085

S. F. SUTHERLAND

COLLAPSIBLE FOLDING BOX

Original Filed May 17, 1921 4 Sheets-Sheet 3

Inventor

Stafford F. Sutherland

By Eccleston & Eccleston

Attorneys

May 26, 1925. Re. 16,085

S. F. SUTHERLAND

COLLAPSIBLE FOLDING BOX

Original Filed May 17, 1921 4 Sheets-Sheet 4

Inventor
Stafford F. Sutherland

By Eccleston & Eccleston
Attorneys

Reissued May 26, 1925. Re. 16,085

UNITED STATES PATENT OFFICE.

STAFFORD F. SUTHERLAND, OF PHILADELPHIA, PENNSYLVANIA, ASSIGNOR TO SUTHERLAND COLLAPSIBLE PAPER BOX COMPANY, OF PHILADELPHIA, PENNSYLVANIA, A CORPORATION OF DELAWARE.

COLLAPSIBLE FOLDING BOX.

Original No. 1,443,055, dated January 23, 1923, Serial No. 470,328, filed May 17, 1921. Application for reissue filed January 9, 1925. Serial No. 1,501.

*To all whom it may concern:*

Be it known that I, STAFFORD F. SUTHERLAND, a citizen of the United States, residing in the city and county of Philadelphia and State of Pennsylvania, have invented certain new and useful Improvements in Collapsible Folding Boxes, of which the following is a specification.

My invention relates to folding-boxes and especially to that type known as collapsible boxes, and the object of my invention is to provide an improved box of this character, that is simple in construction, inexpensive of manufacture, and can be very easily and very quickly set up (erected in box form) and is securely held in erect position after it is set up, and also presents a very neat appearance.

Another object of my invention is to provide a collapsible folding box, that may be made of cheap box-board (such as is now used in the making of what is known as set-up boxes, boxes that are made set-up or erect and are not collapsible) and covered or partly covered with paper or other suitable material.

A further object of my invention resides in a novel method of constructing the above type of box, such method being well adapted to be practised either by hand or machinery.

Figure 1:
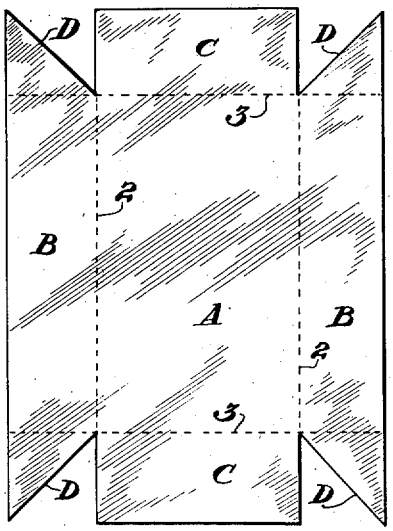
Figure 2:
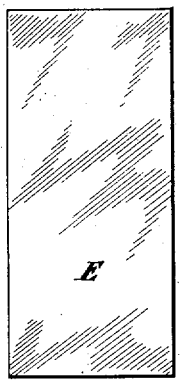
Figure 3:
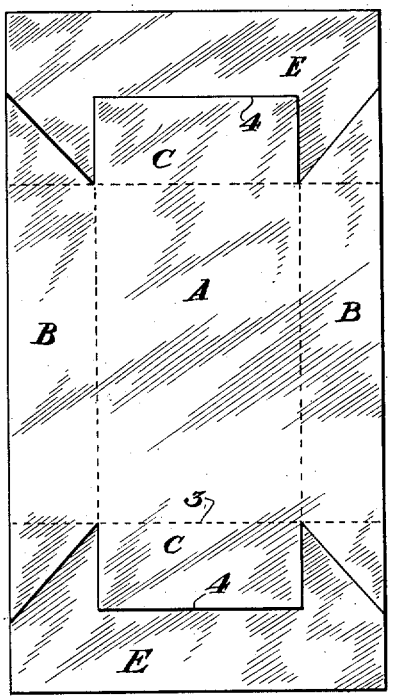
Figure 4:
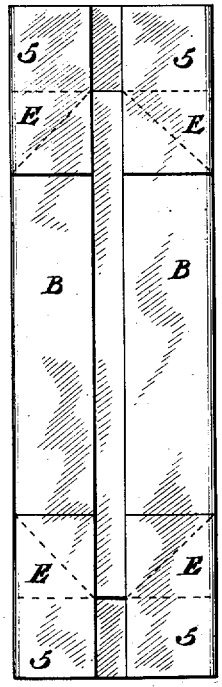
Figure 7:
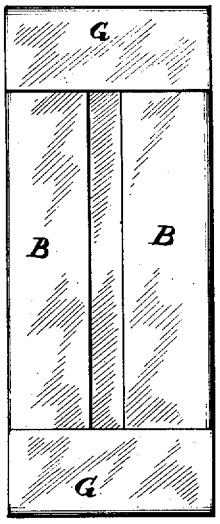
Figure 5:
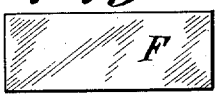
Figure 10:
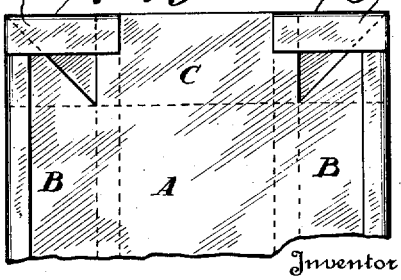
Figure 6:
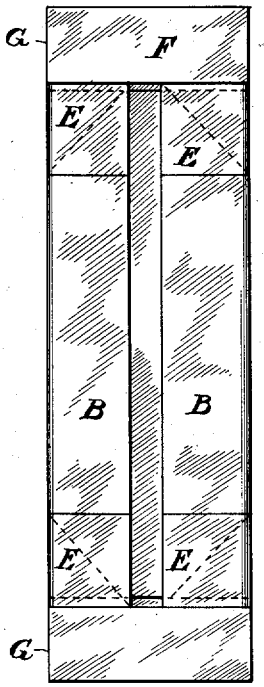
Figure 9:
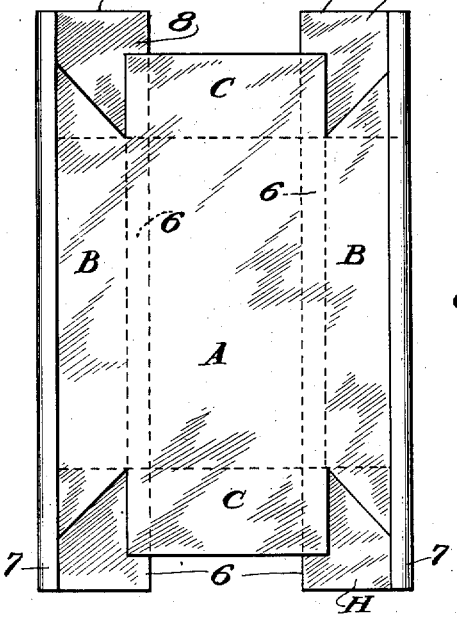
Figure 8:
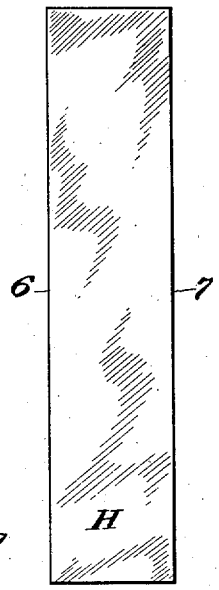
Figure 11:
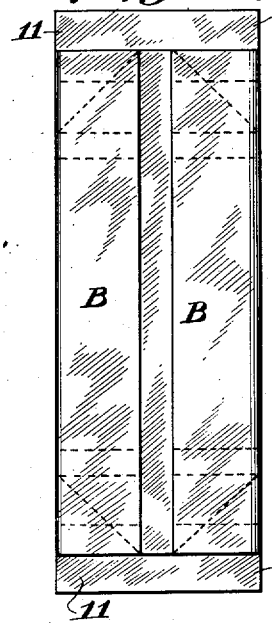
Figure 12:
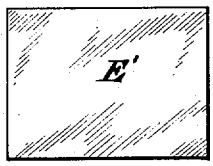
Figure 13:
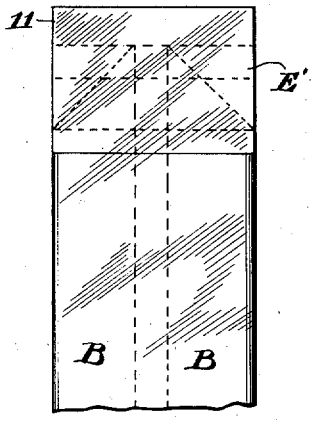
Figure 19:
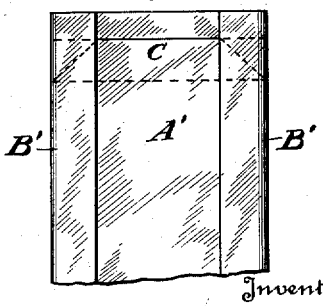
Figure 15:
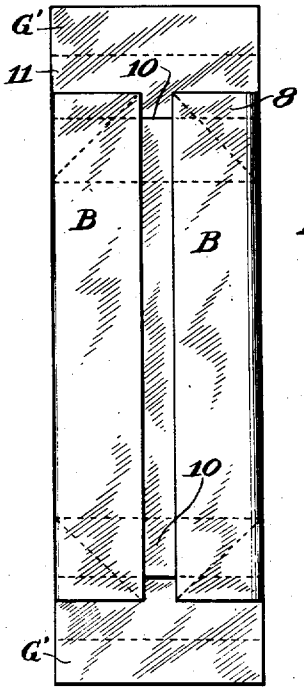
Figure 16:
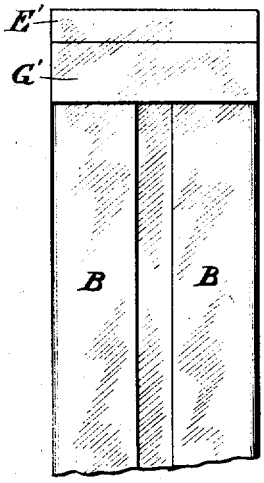
Figure 17:
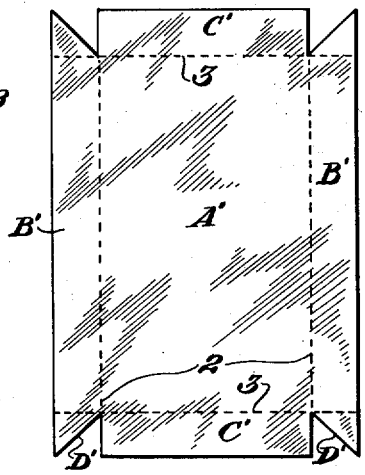
Figure 18:
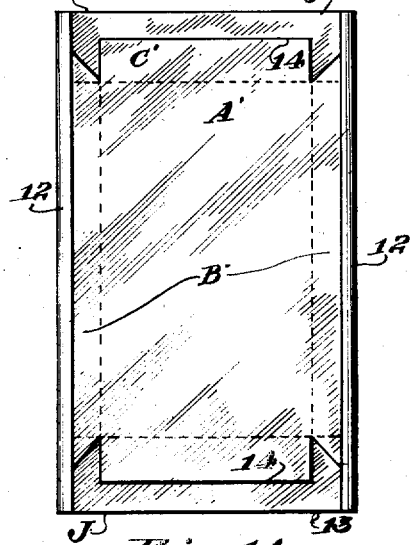
Figure 14:
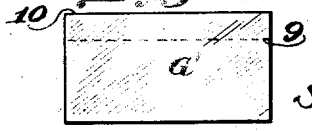
Figure 20:
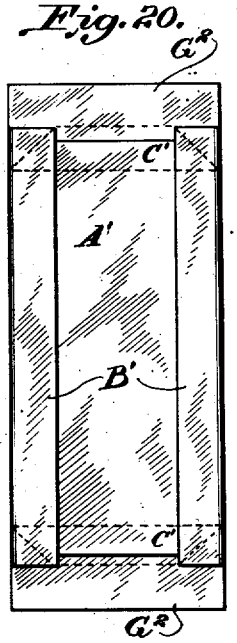
Figure 21:
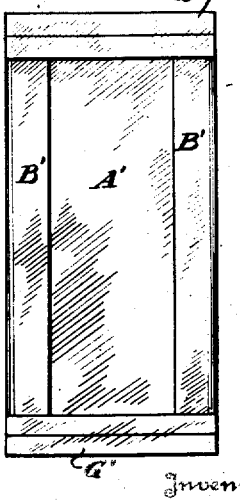
Figure 22:
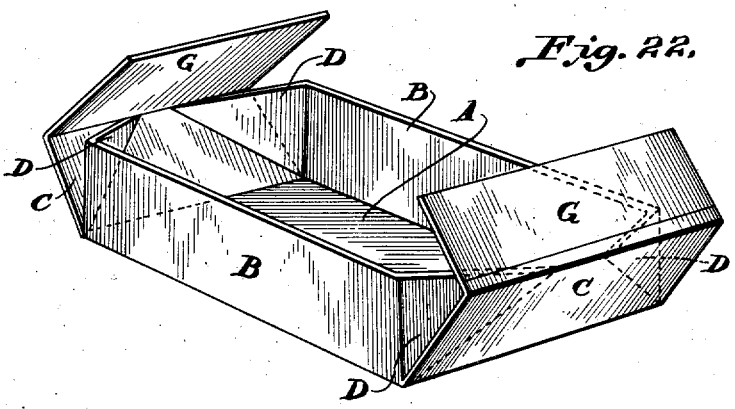
Figure 23:
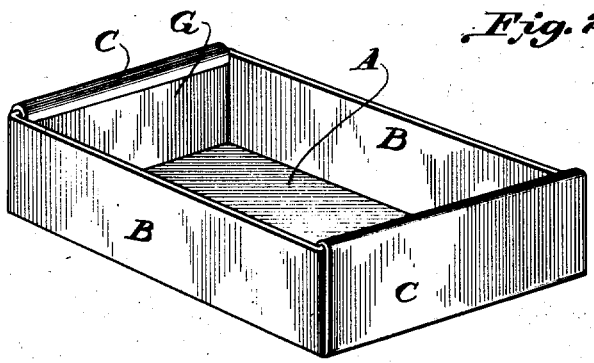

The objects and advantages of my improved box will be readily apparent in this specification when taken in connection with the accompanying drawings, in which Fig. 1 is the blank of the box; Figure 2 is a facing-strip; Figure 3 shows facing-strips attached to opposite ends of the blank; Figure 4 shows the opposite side-walls of the box folded inwardly; Figure 5 is a reinforcing strip; Figure 6 shows reinforcing strips attached to the paper flaps; Figure 7 shows the complete box with the flaps folded inwardly on the box; Figure 8 is a covering-trip; Figures 9 and 10 show covering-strips attached to opposite side-walls of the box; Figure 12 is a facing-strip; Figures 11 and 13 show facing-strips (Fig. 12) attached to opposite end-walls of the box; Figure 14 is a holding-flap; Figures 15 and 16 show the complete box with holding-flaps attached; Figure 17 is a blank of the box cover; Figure 18 shows this blank entirely covered with paper; Figure 19 shows opposite side-walls of the cover folded inwardly; Figures 20 and 21 show the complete box cover with holding-flaps attached. Figure 22 is a perspective of the box partly set up. Figure 23 is a perspective of the box fully set up, and Figure 24 is a perspective of the box and its cover.

Referring to the drawings, Figure 1 is the blank of which the box is formed, and is a single piece of paper-board or other suitable material, and it is scored or creased longitudinally at the dotted lines 2 and transversely at the dotted lines 3, so as to facilitate the bending or folding of its various parts at these lines in forming the box, and this blank comprises the following foldable parts, a bottom A, opposite side-walls B integrally connected with the bottom, opposite endwalls C integrally connected with the bottom and triangular corner-flaps D integrally connected with the side-walls. A strip of paper or other suitable light material (Fig. 2), and which I will call the facing-strip E, is gummed to the outer face of each end-wall C and the adjacent triangular corner-flaps D, as shown in Figure 3, and it will be seen that this facing-strip extends across the blank and covers the end-wall and both triangular corner-flaps and connects them, and it also extends outwardly beyond the edge 4 of the end wall, and the object of which will be presently understood. The side-walls B and the corner-flaps are then folded inwardly on the blank as shown in Figure 4, and a strip of heavy paper or light box-board (Figure 5), and which I will call the reinforcing strip F, is gummed to the part 5 of the facing-strip E that projects outwardly beyond each end wall, as shown in Fig. 6, and thus forming a flap which I will call the holding-flap G and which holds the box in an upright position when it is set up. In this set-up condition of the box the end edges of the holding or locking flaps G frictionally engage the side-walls or members of the box and are thus held in locking position. Fig. 7 is the complete box, in its flat or collapsed form, with the holding flaps G folded on the box.

When it is desired to have all the walls of the box covered, this may be done in the following manner—a strip of paper (Fig. 8), which I will call the covering-strip H, is pasted to the outer face of each side-wall B with the lower edge 6 of the paper pasted to the bottom of the box and its upper edge 7 turned over and pasted to the inner face of the wall, as shown in Fig. 9, and the projecting ends 8 of the covering-strip are turned in and pasted down, as shown in Fig. 10. The side-walls and corner flaps are then folded inwardly on the blank, as shown in Fig. 11, and a facing-strip E′ (Fig. 12) is pasted on the outer face of each end-wall and projects outwardly beyond the outer edge of the end-wall, as shown in Figs. 11 and 13. In Fig. 11 the front, and in Fig. 13 the back, of the box is shown, with the facing-strip attached. A holding-flap G′ (Fig. 14) that is creased, scored or slit at the dotted line 9, is attached to each end of the box as shown in Fig. 15; the part 10 of this flap is inserted between the inner face of the end-wall and the inturned parts 8 of the facing-strip and is gummed to these inturned parts, and the projecting part 11 of the facing-strip is gummed to the flap. Fig. 16 shows the holding-flap G′ folded inwardly on the box. Fig. 17 is the blank of the box-cover which is practically the same as the blank Fig. 1 of the box, and this blank is entirely covered on its outer face by a paper strip or sheet as shown in Fig. 18 and which I will call the facing-strip or covering-sheet J. Opposite projecting edges 12 of this covering-sheet or facing-strip are turned over the outer edges of the side-walls B′ and pasted on their inner faces, and the ends 13 of the sheet extend outwardly beyond the outer edges 14 of the end-walls C′. The side-walls and triangular flaps D′ are then folded inwardly on the blank as shown in Fig. 19 and a holding flap $G^2$ attached to each end, as shown in Fig. 20. Fig. 21 shows the complete box cover with the holding-flaps folded inwardly on the cover. It is of course obvious that the box may be covered in the same manner as its cover, or the cover may be covered in the same manner as the box. In setting up (erecting) the box or its cover, from its flat form, it is only necessary to grasp both end-walls and push them to an erect position and the side-walls will automatically move to an erect position also; the other movable parts automatically moving to their respective positions, the holding-flap moving downward in the interior of the box, and against the inner face of the corner-folds and the end-wall.

Figure 24:
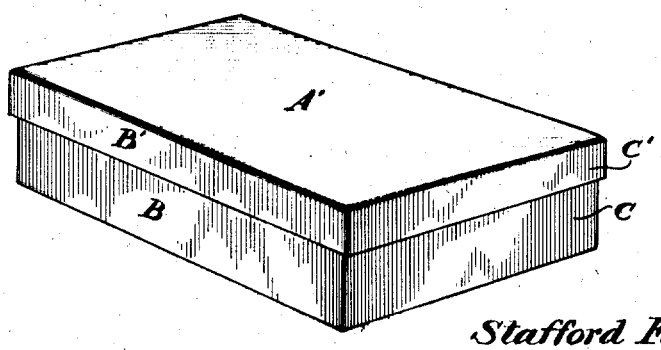

Fig. 22 shows the box partly set up,
Fig. 23 the box fully set up, and
Fig. 24 the box with its cover on it.

In all forms of the invention it will be obvious that the essential steps in the method of forming the box are the same. For instance, in all of the modifications, the facing material, whether formed of several strips or a single strip or sheet, is attached to the blank and partly or entirely covers the outer surface of the blank; the side walls of the box and the covering material carried thereby are folded onto the bottom of the box; and the locking flaps are attached to the ends of the facing strip or strips.

Having fully described my invention, what I claim as new, and desire to secure by Letters Patent is:

1. A collapsible box including integral foldable side and end walls, corner flaps on said side walls, a facing strip secured to the side and end walls and corner flaps, and locking flaps secured to said facing strip.

2. A collapsible box including integral foldable side and end walls, corner flaps on said side walls, flexible means connecting said corner flaps and end walls, and locking flaps secured to said flexible means.

3. In a collapsible box having integral foldable side and end walls, a facing strip secured to the side walls and an end wall, and a locking flap secured to the facing strip.

4. In a collapsible box having integral foldable side and end walls, a facing strip secured to the side walls and end walls and locking flaps secured to the facing strip, said locking flaps being of substantially the same depth as the end walls.

5. In a collapsible box having integral foldable side and end walls, corner flaps on the side walls, a facing strip connecting a pair of the corner flaps and an end wall, and a locking flap secured to the facing strip.

6. In a collapsible box having integral foldable side and end walls, a facing strip secured to the side walls and end walls and locking flaps secured to said facing strip, the facing strip adapted to form corner folds.

7. The herein described method of forming collapsible boxes which comprises applying a facing material to a box blank, folding the side walls of the box blank and facing material carried thereby onto the bottom of the box blank, and attaching locking flaps to the ends of the facing material.

8. The herein described method of forming collapsible boxes which comprises applying facing material to a box blank with the ends of the facing material extending slightly beyond the ends of the blank, folding the side walls of the blank and the facing material carried thereby onto the bottom of the blank, and attaching locking flaps to the ends of the facing material.

9. The herein described method of forming collapsible boxes which comprises applying facing material to a box blank having a bottom, side and end walls and corner flaps, folding the side walls of the box blank and facing material carried thereby onto the bottom of the box blank, and attaching locking flaps to the ends of the facing material.

10. The herein described method of forming collapsible boxes which comprises applying facing strips to the end walls of the box blank, folding the side walls of the box blank onto the bottom of the blank, and attaching locking flaps to the ends of the facing strips.

STAFFORD F. SUTHERLAND.